Sept. 11, 1956     R. G. LE TOURNEAU     2,762,141
EXCAVATING MACHINE

Filed July 1, 1952     14 Sheets-Sheet 1

INVENTOR.
ROBERT G. LE TOURNEAU
Lyon & Lyon
ATTORNEYS

Sept. 11, 1956  R. G. LE TOURNEAU  2,762,141
EXCAVATING MACHINE
Filed July 1, 1952  14 Sheets-Sheet 2

INVENTOR.
ROBERT G. LE TOURNEAU
BY Lyon & Lyon
ATTORNEYS

Sept. 11, 1956 R. G. LE TOURNEAU 2,762,141
EXCAVATING MACHINE
Filed July 1, 1952 14 Sheets-Sheet 6
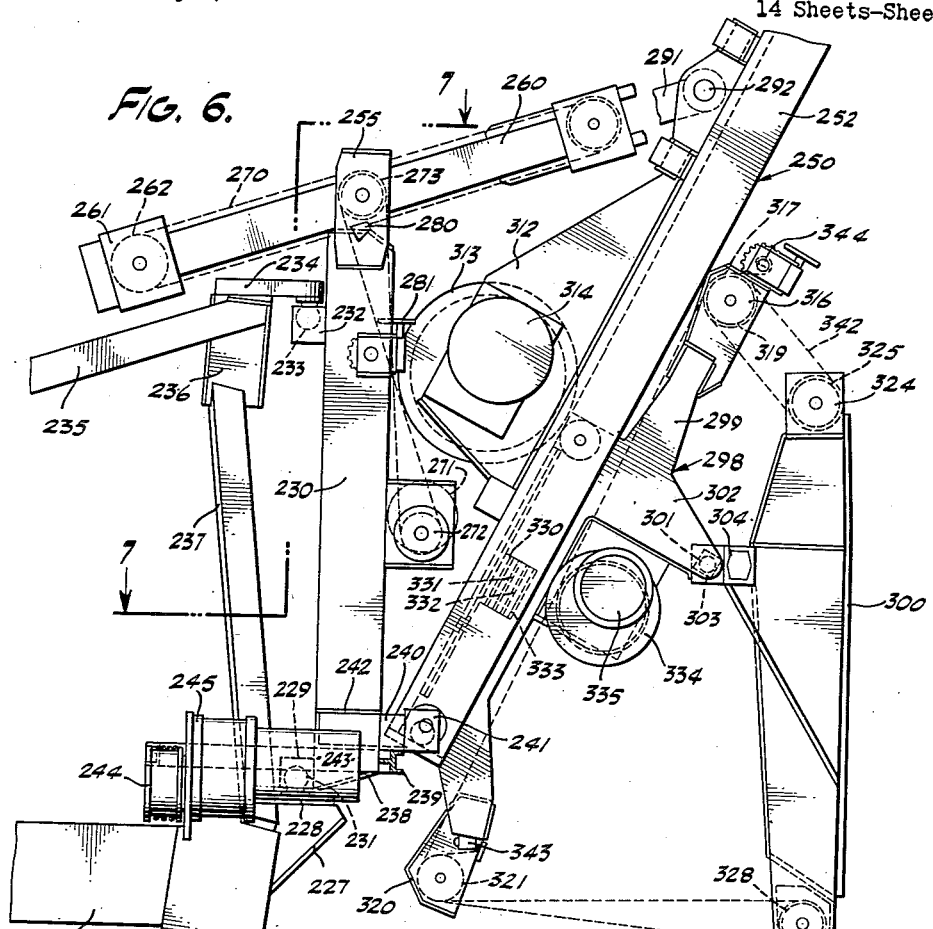
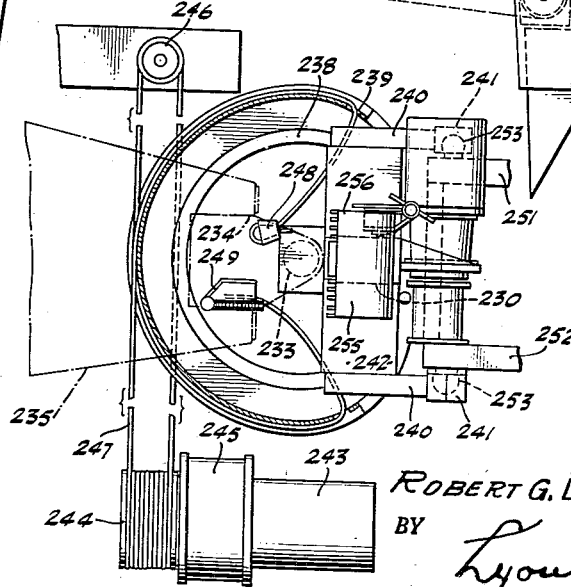
INVENTOR.
ROBERT G. LE TOURNEAU
BY
ATTORNEYS

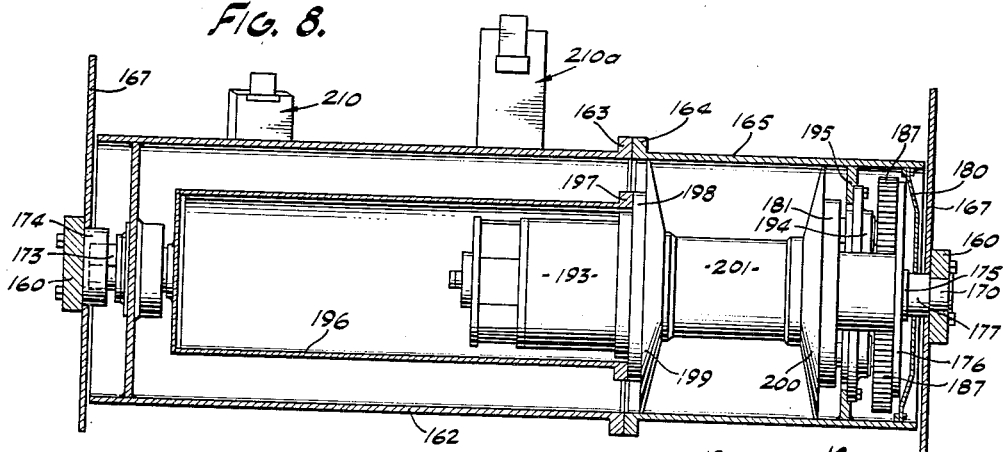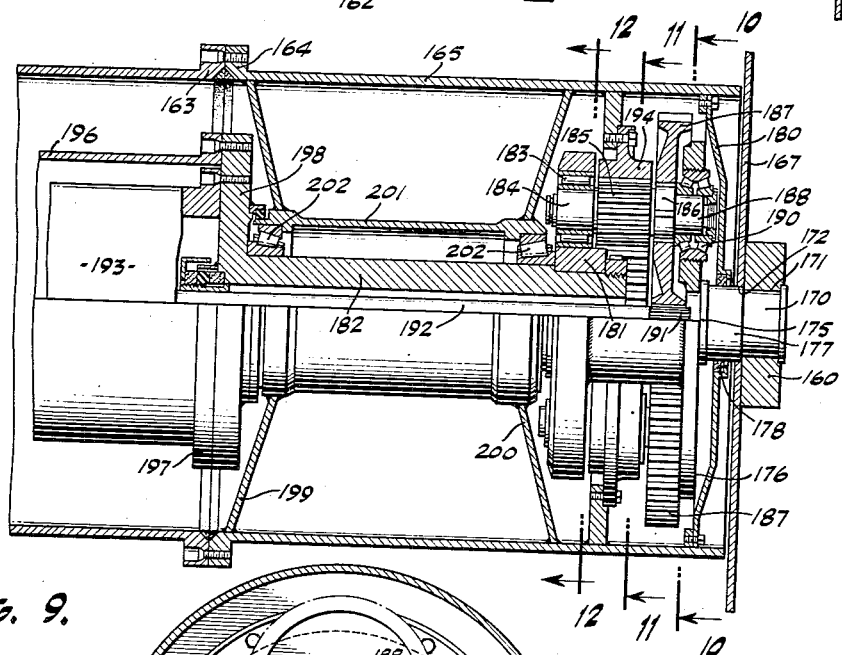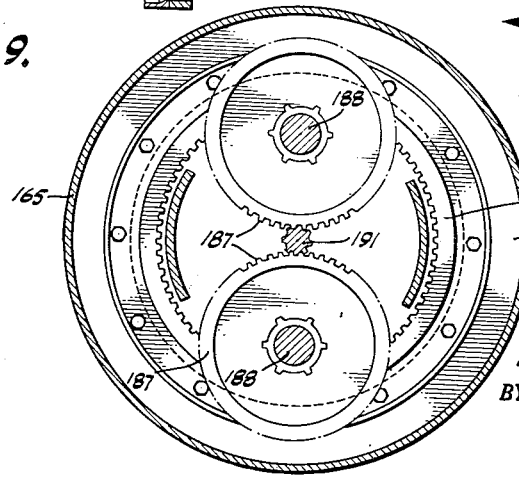

INVENTOR.
ROBERT G. LE TOURNEAU
BY
Lyon & Lyon
ATTORNEYS.

Sept. 11, 1956     R. G. LE TOURNEAU     2,762,141
EXCAVATING MACHINE
Filed July 1, 1952     14 Sheets-Sheet 10
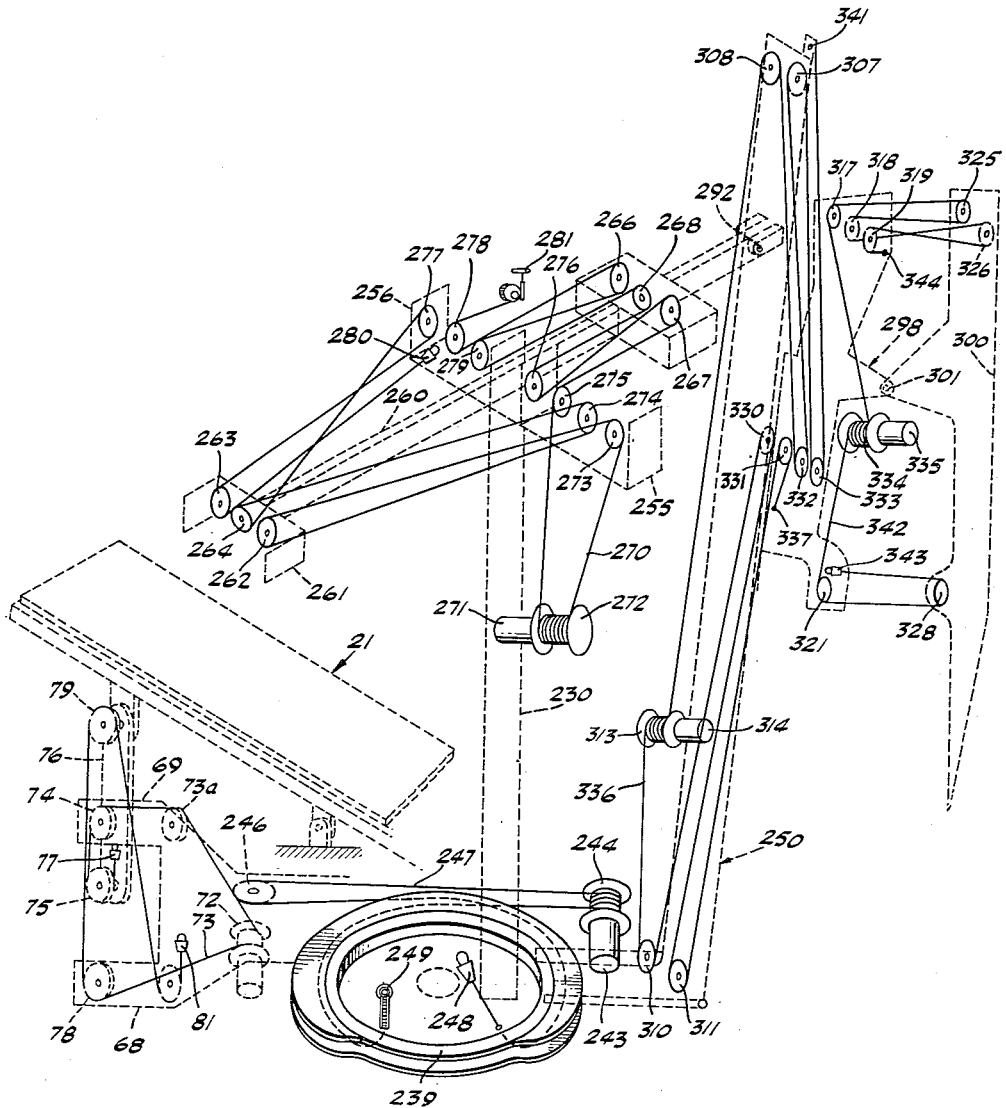
FIG. 18.
INVENTOR.
ROBERT G. LE TOURNEAU
BY
ATTORNEYS Sept. 11, 1956  R. G. LE TOURNEAU  2,762,141
EXCAVATING MACHINE
Filed July 1, 1952  14 Sheets-Sheet 11

INVENTOR.
ROBERT G. LE TOURNEAU
BY
Lyon & Lyon
ATTORNEYS

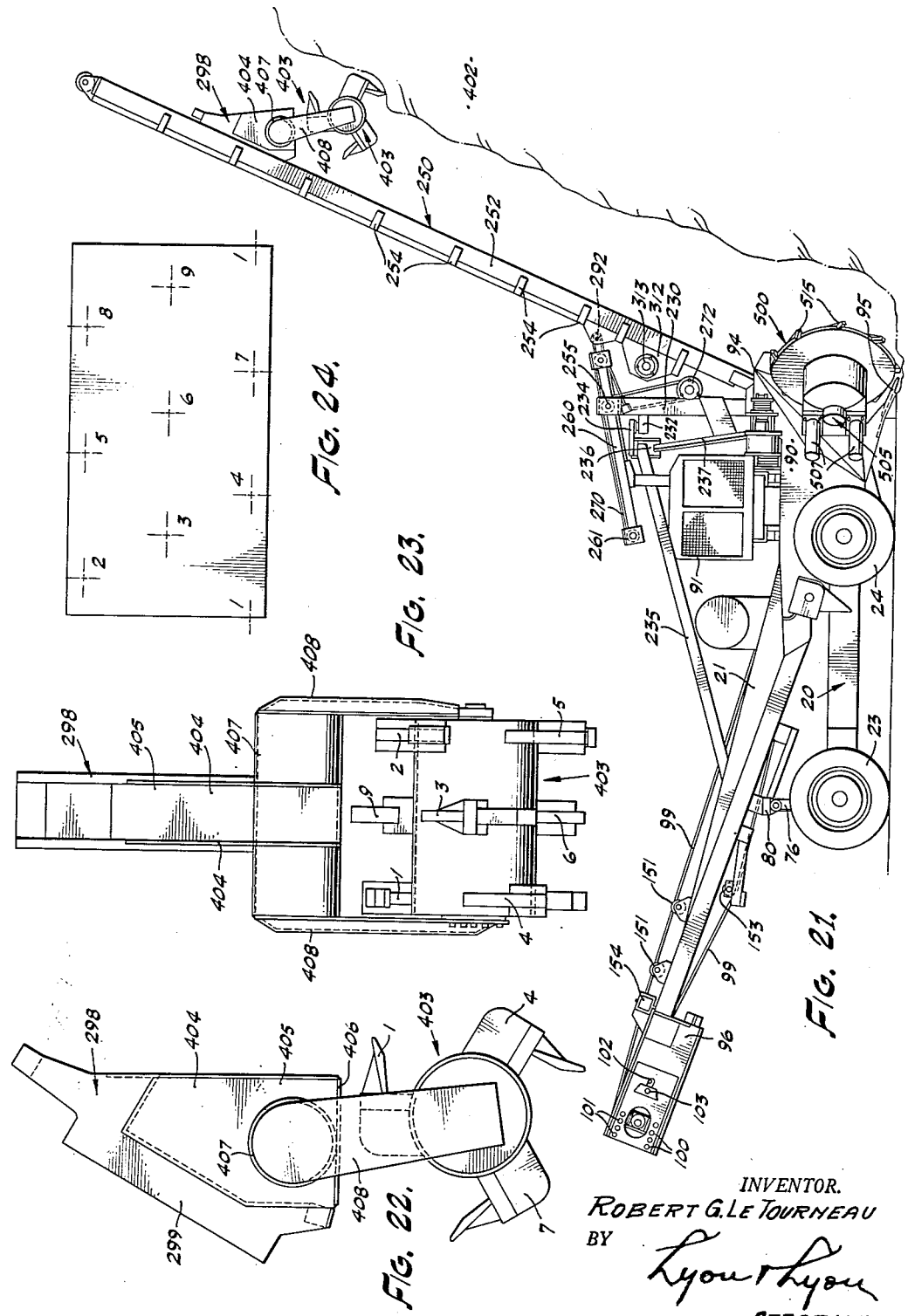

Sept. 11, 1956 R. G. LE TOURNEAU 2,762,141
EXCAVATING MACHINE
Filed July 1, 1952 14 Sheets-Sheet 13

INVENTOR.
ROBERT G. LE TOURNEAU
BY Lyon & Lyon
ATTORNEYS

Sept. 11, 1956 R. G. LE TOURNEAU 2,762,141
EXCAVATING MACHINE
Filed July 1, 1952 14 Sheets-Sheet 14

INVENTOR.
ROBERT G. LE TOURNEAU
BY
*Lyon & Lyon*
ATTORNEYS

United States Patent Office 2,762,141
Patented Sept. 11, 1956

2,762,141
EXCAVATING MACHINE
Robert G. Le Tourneau, Longview, Tex.

Application July 1, 1952, Serial No. 296,687

4 Claims. (Cl. 37—190)

This invention relates to an earth moving machine and more particularly to an excavating machine having a conveyor loader and adapted to excavate material ahead of the machine and load it into a transporting vehicle at the rear, or onto another conveyor belt.

This invention contemplates a wheel vehicle having a scraper blade for picking up earth and presenting it to an endless belt conveyor, which endless belt conveyor is powered to deliver excavated earth into transporting vehicles.

The invention also contemplates, in combination with the scraper and conveyor, a boom provided with a travelling rotary rooter or tooth, which boom can be swung about a horizontal pivot to reach high mounds of earth and the mounds then reduced by engagement with the rooter or tooth to scoop the loosened earth into the path of the scraper. With the combination thus provided, the earth moving machine of this invention is capable of moving up against a high mound of earth and travelling directly therethrough making a smooth channel with straight line slopes of any desired angle.

It is accordingly one object of this invention to provide a machine which can approach a relatively high mound of earth and dig and load the entire amount.

It is another object of this invention to provide an earth moving machine which can dig along the grade and down a bank at the same time so that it may approach a large mound or embankment and cut a path at ground level wide enough for the entire machine to move straight through without the disadvantage of a revolving shovel having to revolve 180° to load a vehicle directly behind.

It is another object of this invention to provide a digging tool which is mounted for a digging action in a straight line.

It is another object of this invention to provide such a digging tool which is adjustable to any angle for preparing straight line slopes.

It is another object of this invention to provide a combination scraper blade and conveyor belt and digging tool in which the digging tool is mounted to present the loosened earth directly to the blade for loading by the blade and conveyor belt.

It is another object of this invention to provide a combination scraper blade and conveyor belt and rotary digging means to loosen material ahead of the blade and present the same to the blade.

These and other objects and advantages of the present invention will be apparent from the annexed specification in which:

Figure 1A is an enlarged view of the elevator push beam showing its working arrangement for lowering and raising the elevator.

Figure 6 is an enlarged side view of the lower end of the track and its car.

Figure 7 is a section taken along the line 7—7 of Figure 6 showing the turntable mechanism.

Figure 8 is an enlarged section of the rotary rooter.

Figure 9 is an enlarged section of a portion of the rotary rooter showing the driving unit.

Figure 10 is a section taken along the line 10—10 of Figure 9.

Figure 18 is a schematic reeving diagram for the cable operated mechanisms.

Figure 21 is a side view of my excavating machine showing a different embodiment of the front digging equipment.

Figure 22 is a side view of the rotary rooter and car structure with only part of the teeth shown for clarity.

Figure 23 is a front view of Figure 22 showing the teeth mounted.

Figure 24 is a schematic view showing the relative locations of the nine rooter teeth on the unrolled drum.

Frame and steerable wheels

Figure 1:
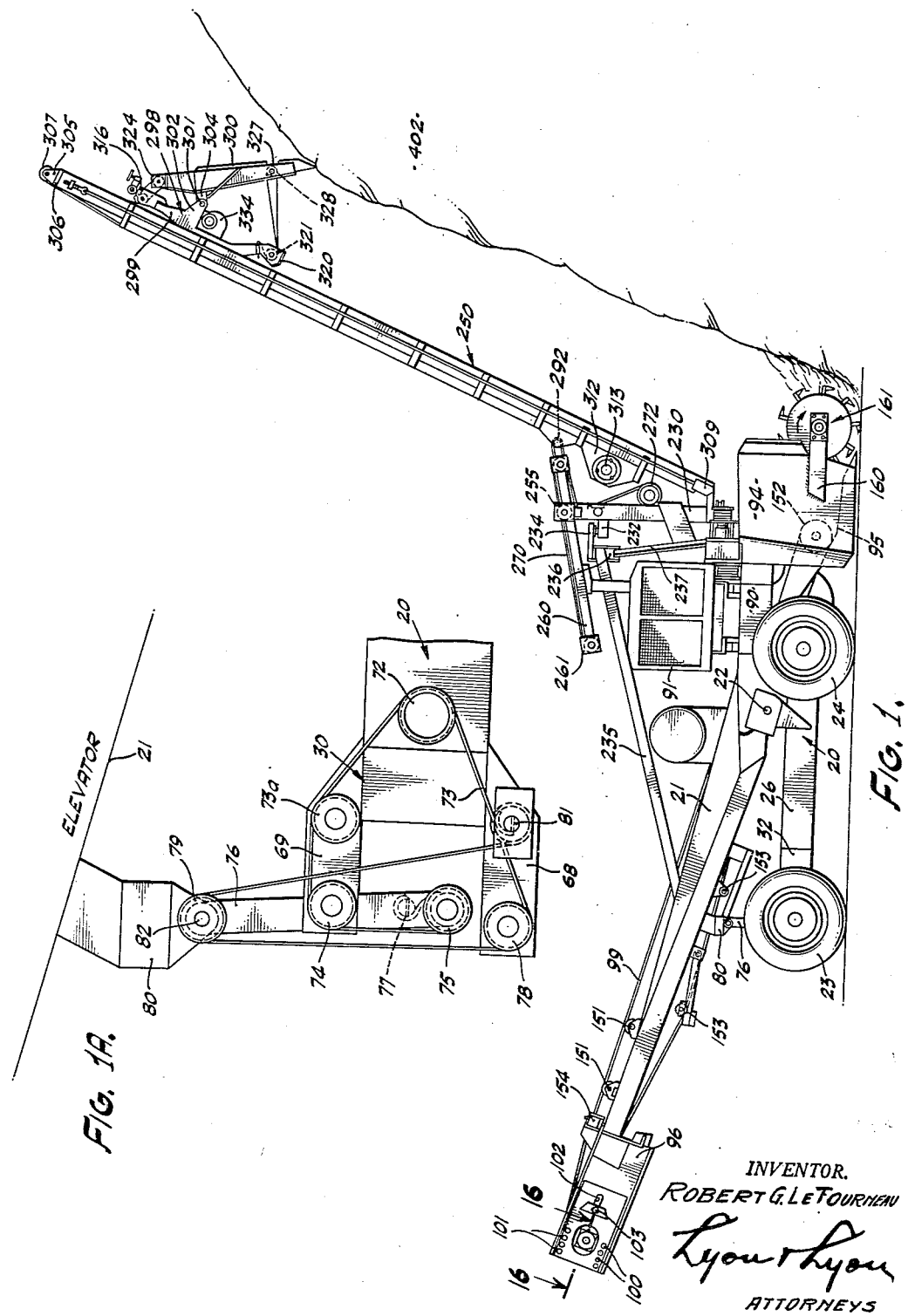
Figure 1 is a side view of an excavating machine embodying the present invention.
Figure 2:
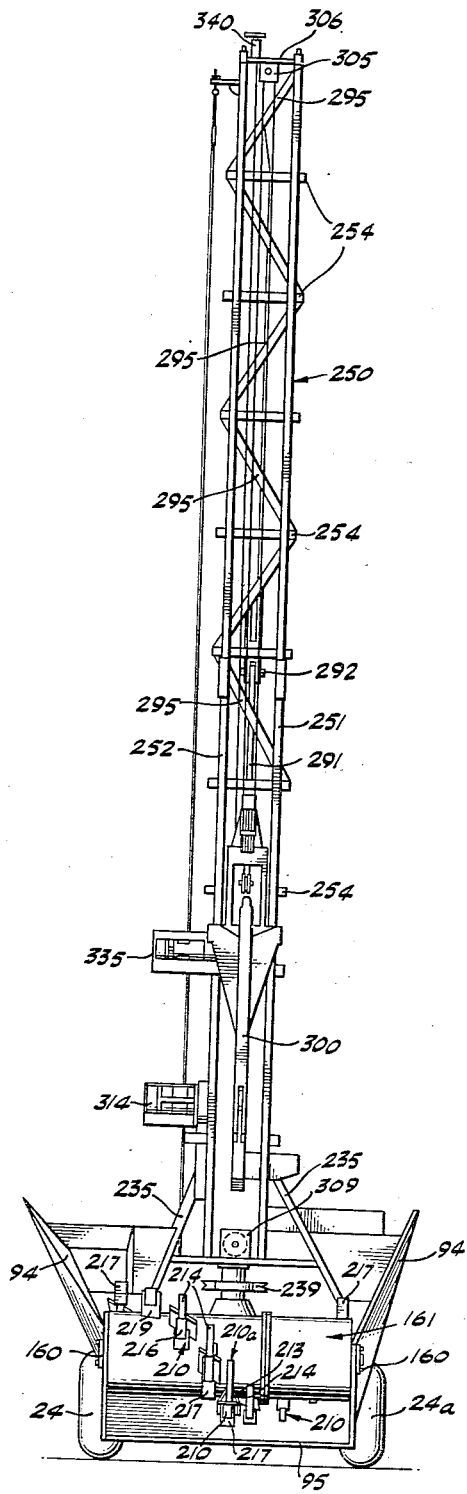
Figure 2 is a front elevation of the device shown in Figure 1, viewed from left to right in Figure 1.
Figure 2A:
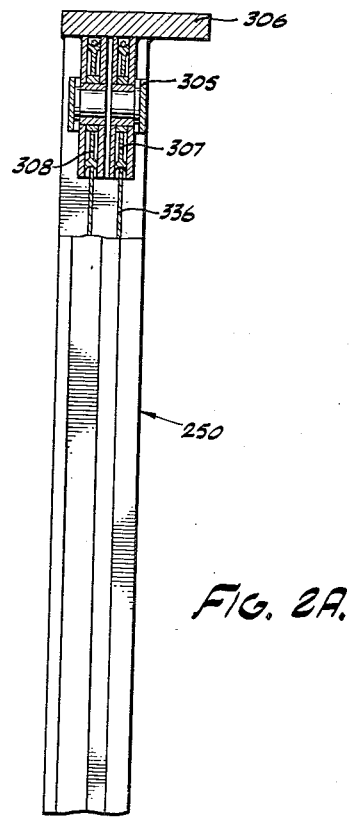
Figure 2A is an enlarged partial section of the upper structure of the track.
Figure 3:
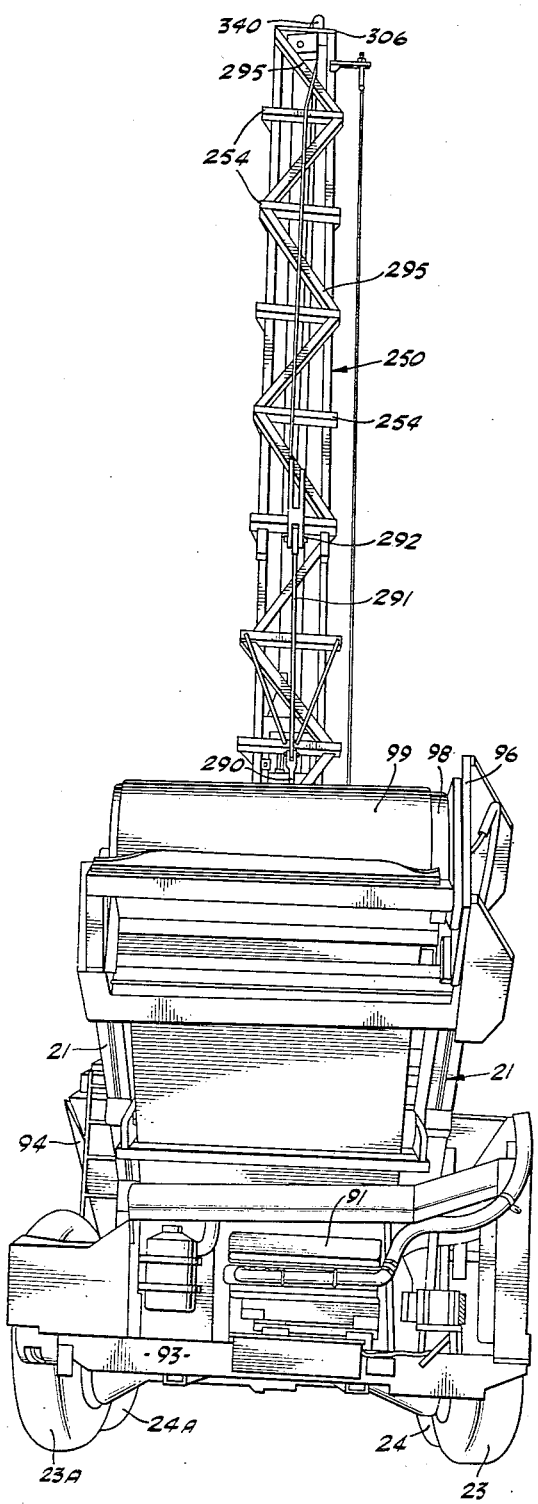
Figure 3 is a rear view looking from left to right of Figure 1, with the engine shown in an alternative position at the rear of the machine.
Figure 4:
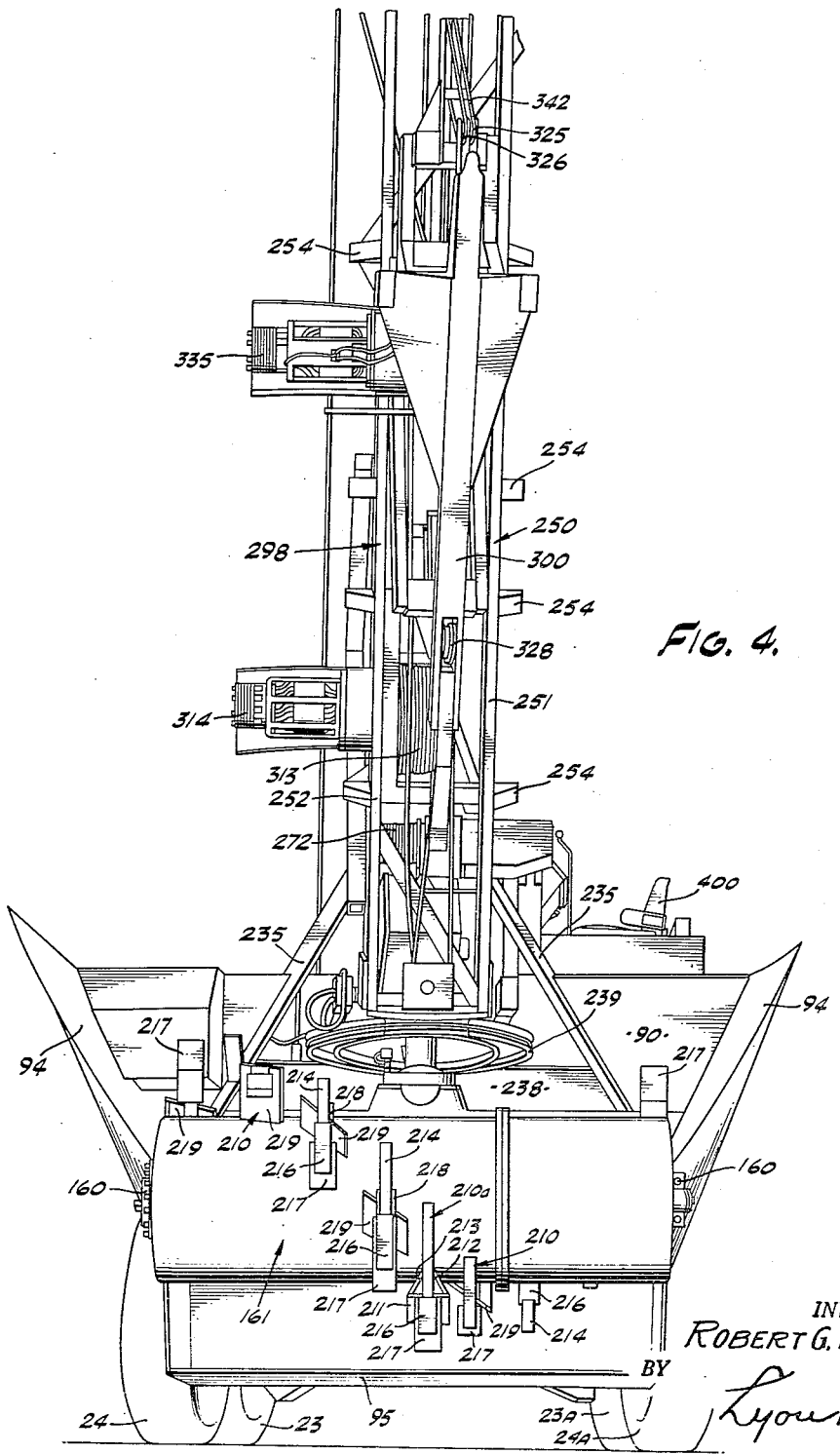
Figure 4 is an enlarged fragmentary front elevation.
Figure 19:
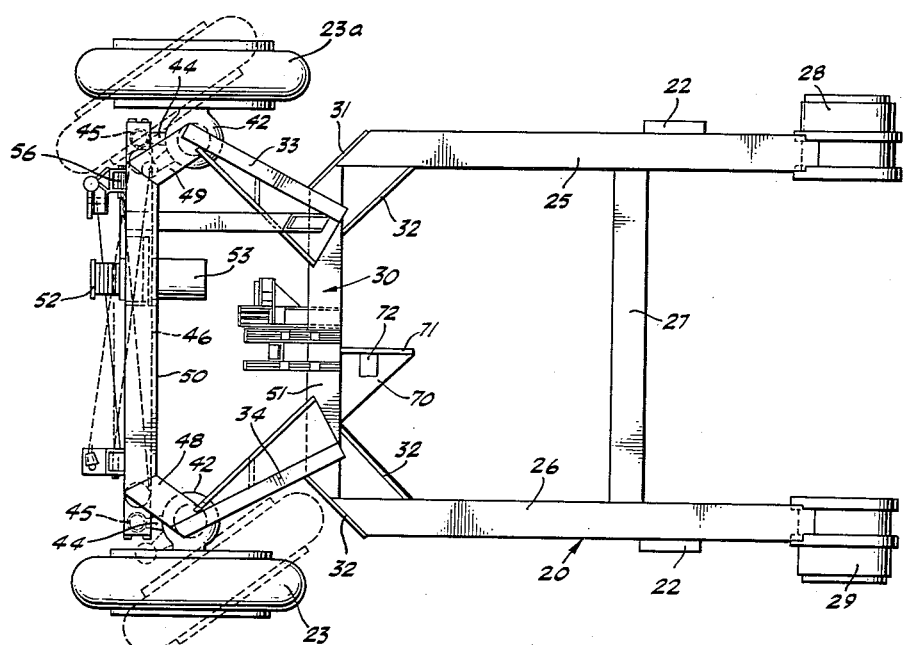
Figure 19 is a plan view of the vertical frame.
Figure 20:
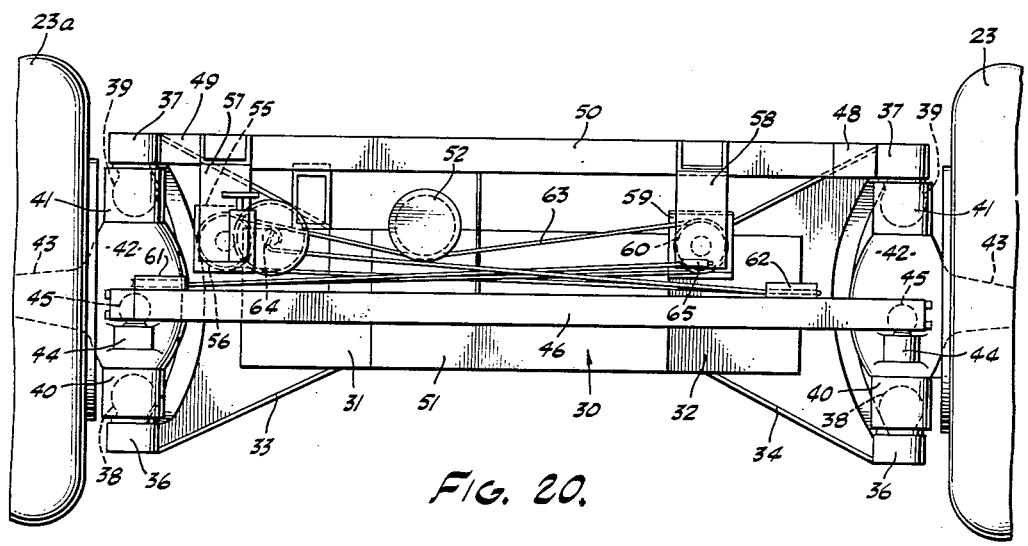
Figure 20 is an enlarged rear view of the vertical frame.

Referring now more particularly to the drawings and particularly to Figures 19 and 20, there is shown a digger embodying the present invention, which includes a main frame 20 on which is pivoted an elevator frame 21 as at 22. The frame 20 is supported by four rubber tired wheels, two of which are shown in Figure 1 and numbered 23 and 24, and the other wheels 23a and 24a are shown in Figures 19 and 20 and in Figures 3 and 4. The frame 20 comprises a pair of spaced parallel box members 25 and 26, a cross piece 27, a pair of wheel mounts 28 and 29 for the front wheels and a cross piece 30 at the rear end thereof. The ends of the box members 25 and 26 are bevelled, and plates 31 and 32 are welded thereto as indicated. Extending rearwardly and at an angle from the end piece 30 are bifurcated yokes 33 and 34 carrying spaced ball blocks 36 and 37 which mount upstanding balls 38 and depending balls 39 respectively received in sockets 40 and 41 formed upon the end of king pins 42 which are affixed to the spindles 43 of the wheels. Each of the king pins 42 is provided with arms 44 carrying balls 45 received in sockets in a tie bar 46. Welded to the yokes 33 and 34 are inwardly and rearwardly extending box members 48 and 49 and a cross piece member 50. Similarly welded to the yokes 34 is a cross piece 51. Mounted from the cross piece 50 is a reversible winch 52 driven by a reversible electric motor 53. A sheave housing 55 houses a sheave 56, which sheave housing is mounted on the cross piece 50 by an arm 57 and a similar arm 58 mounts a sheave housing 59, housing a sheave 60. Tie bar 46 is provided with a pair of sheaves 61 and 62 mounted thereon. A cable 63 is reeved as follows: Proceeding from the winch 52, the cable passes over and around the sheave 56 and then proceeds to the sheave 62 on the tie bar 46 and from there to an adjustable cable anchor 64. The other end of the cable proceeds from the winch 52 to the sheave 60 thence to the sheave 61 on the tie bar 46 and back to a fixed anchor 65.

From the foregoing, it will be apparent that upon energization of the electric motor 53 to wind the cable in one direction, the wheels will be turned in one direction and upon reverse movement of the electric motor 53, the wheels will be turned in the opposite direction.

It is contemplated that the king pins 42 may be substituted by individual electric motors and thus power supplied to the wheels as desired. In the event that such electromotors are substituted for the king pins 42, the wheel and motor assembly, preferably used, are as shown in a copending application of R. G. Le Tourneau, Serial No. 181,038 filed August 23, 1950, now Patent No. 2,726,726.

Elevator

Referring now more particularly to Figure 1A taken in conjunction with Figure 19, the means for lowering and raising the elevator frame 21 is illustrated. To the cross piece 30 is welded a pair of spaced supports 68 and 69 and also a gusset plate 70 and an upstanding plate 71. The upstanding plate 72 mounts a double wound electric winch 72. Reeved on the winch 72 is a cable 73, one lead of which proceeds from the winch 72 to sheaves 73a and 74 mounted upon the support 69. From there, the cable proceeds to a sheave 75 mounted upon one end of a push beam 76 and thence to an adjustable anchor 77. The other lead of the cable 73 proceeds from the winch 72 to a sheave 78 mounted upon the support 68 and from thence it is reeved to a sheave 79, mounted upon a depending bracket 80 carried by the elevator frame 21, and from there it passes to an adjustable anchor or cable tightener 81 mounted upon the support 68. The push beam 76 is pivotally mounted as at 82 to the bracket 80. It will be apparent from the foregoing description that turning of the winch 72 in one direction will cause the push beam to be elevated and consequently to raise the elevator frame 21, while the reverse movement will lower the elevator frame 21.

Attached to the forward end of the elevator frame 21 and forming a part thereof is a substantially horizontal bed 90, which bed 90 may support an engine 91 which serves as a source of power for driving the movable mechanism of this invention. However, in the embodiment shown in Figure 3, this engine has been moved to a bed 93 carried at the rear of the machine.

Attached to the bed 90 as by welding or the like are side plates 94 which in turn are welded to a bottom plate 95 in the shape of a scraper blade.

From the foregoing, it will be apparent that raising or lowering of the elevator frame 21 will cause a raising or lowering of the scraper blade 95 with respect to the ground.

Conveyor belt

The other end of the elevator frame 21 is provided with a bracket 96 in which is adjustably supported a mount 97 for a belt supporting and driving roll 98 adapted to drive the endless belt 99. The mount 97 is welded to a plate (not shown), which plate lies directly back of the bracket 96, as shown in Figure 1. The bracket 96 is provided with a series of bolt holes 100 and 101, is slotted as at 102, and bolts passing through the bolt holes 101 and 102 are affixed to the plate, as is a bolt 103 in the slot 102. As the roll 98 is entirely supported from the mount 97, which is again entirely supported from the plate, which plate is slidable against the bracket 96, the position of the roll 98 may be regulated by moving the bolts in the holes 100 or 101 to a different one of such holes and by loosening and tightening the bolt 103. The mount 97 is in the form of a cylinder and houses an electric motor 105 driving a shaft 106. The mount 97 is welded, as at 107, to a ring 108 to which is affixed a hub 109 as by means of the bolts 110. Bolts 111 removably connect ring 112 to hub 109, and bolts 113 connect ring 112 to housing 114. Bearing 115 is provided between the hub 109 and the shaft 106, and the outer end of the shaft 106 carries a pinion 116. The pinion 116 meshes with gears 117, which gears are mounted in a spider 118 of novel construction. This spider includes a front plate 119 which is provided with a plurality of openings, shown here as two in number, 120 which are threaded to receive the tapered rings 121 which serve as retainers for tapered roller bearings 122 seated on bearing races 123, which races are in turn seated upon the hub 124 of the gears 117 and upon the retaining nut 125. The spider 118 includes a back plate 128, which plate is connected to the plate 119 by spacers (not shown). The plate 128 is keyed to the hub 109 as at 130 and is provided with a plurality of openings, two in number, 131 in which are seated bearings 132 shown here in the form of roller bearings supporting the stub shaft 133 of a pinion 134, which pinion 134 is provided with a hub 136 upon which is fixedly mounted the tapered interior of the hub 137 of the gears 117. The pinions 134 mesh with a ring gear 140, which ring gear is affixed by bolts 141 to an inwardly standing ring 142 welded as at 143 to the roll 98. The roll 98 may also be provided with a pair of inwardly extending plates 144 and 145 welded to the interior of the roll, as shown, and having a central opening welded to a cylinder 146, which cylinder may engage races 147 of roller bearings engaging the hub 109. A sealing ring 150 is also provided between the cylinder 146 and the hub 109, as shown.

From the foregoing description, it will be seen that the roll 98 is entirely supported from the mount 97 and driven by the electric motor 105.

The belt 99 is an endless belt and passes over a series of independently supported rolls 151 to a roll 152 mounted between the side plates 94. Return rolls 153 are provided on the under side of the elevator frame 21.

The belt 99 is adapted at at least one position to engage pivotally mounted rollers 154 mounted on either side of the frame 21 in proximity to the belt 99, and these pivotally mounted rollers operate switches (not shown) for controlling the pivotal movement of the rollers 151 and 153 about a vertical axis for the purpose of centering the belt 99. This particular arrangement is more completely shown in copending application of R. G. Le Tourneau entitled Self-Aligning Carrier, Serial No. 174,450, filed July 18, 1950 now Patent No. 2,664,944.

Rooter

Mounted at the front of the machine by means of a pair of arms 160, extending from the side plates 94, is a digging means in the form of a rotary rooter 161. Referring to Figures 8 through 12, it will be noted that this rotary rooter 161 comprises, in general, a cylinder or drum 162 having a flange 163 to which is bolted a flange 164 of a second cylinder 165. The arms 160 engage plates 167 and a shaft 170 is non-rotatably mounted in an opening 171 in the arm 160 and in an opening 172 in the plate 167. Another shaft 173 has one end non-rotatably mounted in a block 174 carried by the other plate 167 and the other arm 160. The shaft 170 is provided with a flange 175 which is welded to a plate 176 forming a portion of the spider associated with this mechanism. The enlarged portion 177 of the shaft 170 is provided with a bearing 178 engaging a central opening in the end plate 180 carried by the cylinder 165.

The arrangement of parts constituting the matter within the cylinder 165 are generally similar to the remaining elements within roll 98 hereinabove described and include a rear plate 181 similar to the plate 128, which rear plate is fixedly mounted upon a hub 182 similar to the hub 109. The plate 181 carries bearings 183 mounting the shafts 184 carrying pinions 185, which in turn affix to the hubs 186 of gears 187. The gears 187 have hubs 188 mounted in bearings 190 carried by the plate 176. The gears 187 engage a pinion 191 formed on the end of a shaft 192, which shaft is driven by an electromotor 193. The pinions 185 mesh with a ring gear 194 mounted upon an inturn flange 195 welded to the interior of the cylinder 165. A cylinder 196 is provided having a flange 197 bolted to a flange 198 of the hub 182. Plates 199 and 200 may be provided welded to the interior of the cylinder 165 and having central openings therein welded to a cylinder 201, which cylinder 201 bears against bearings 202 on the hub 182, as shown.

Figure 13:
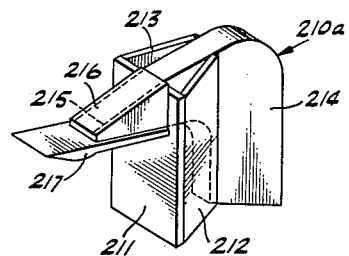
Figure 13 is a perspective view of a rooter tooth employed at the center of the rotary rooter.
Figure 14:
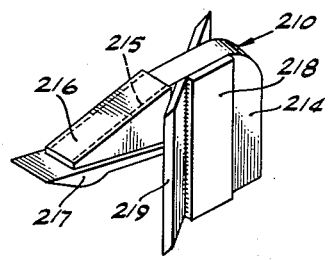
Figure 14 is a perspective view of another form of tooth employed on either side of the center of the rotary rooter.
Figure 12:
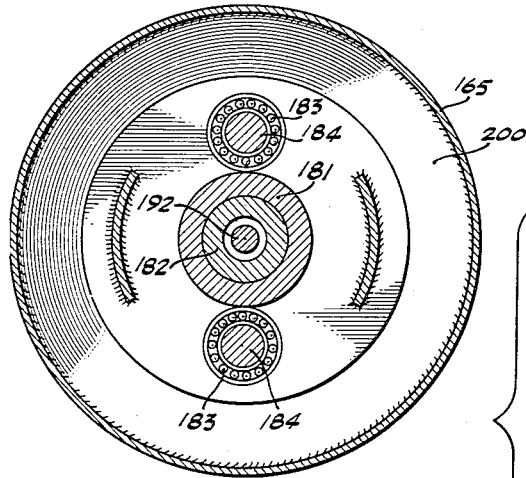
Figure 12 is a section taken along the line 12—12 of Figure 9.
Figure 15:
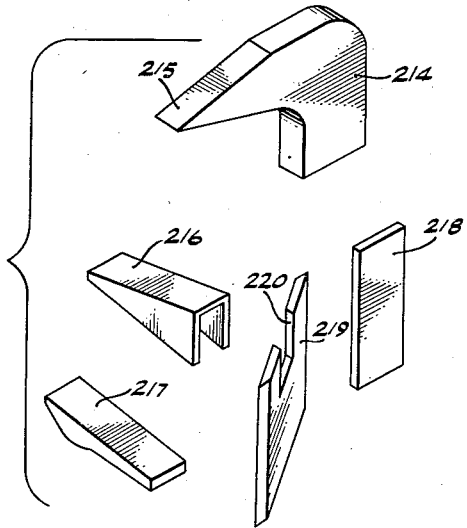
Figure 15 is an exploded view of the parts making up the tooth of Figure 14.
Figure 16:
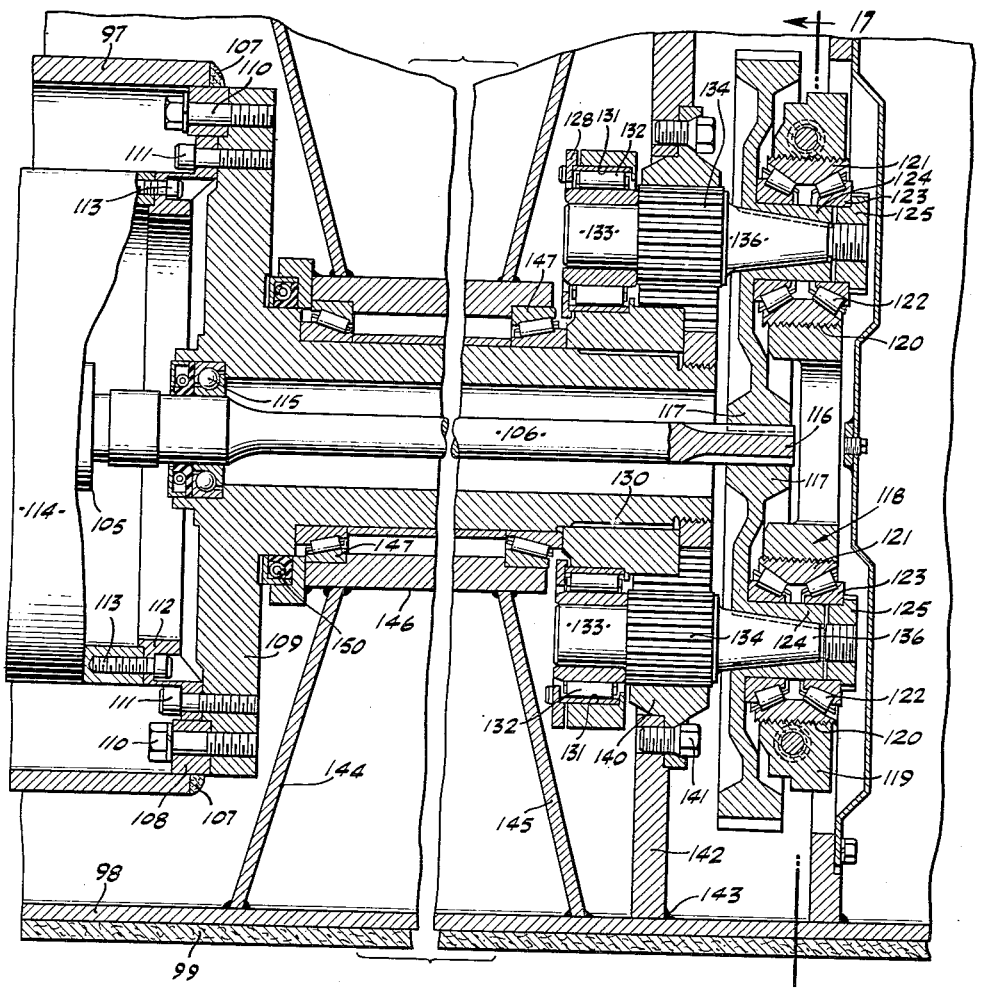
Figure 16 is an enlarged partial section of the power driven head pulley taken about the line 16—16 of Figure 1.
Figure 17:
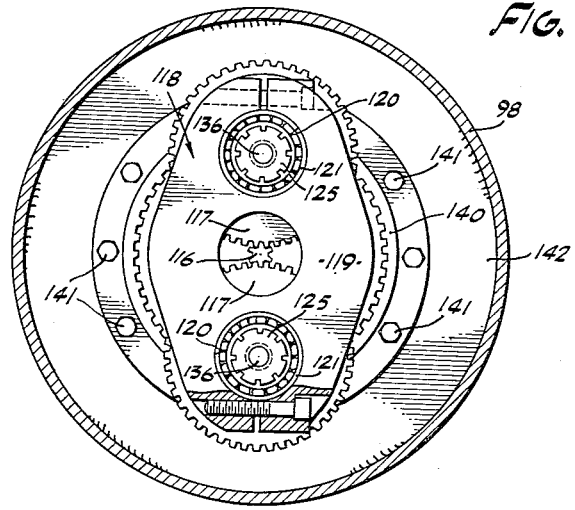
Figure 17 is an end section taken along the line 17—17 of Figure 16.

From the foregoing, it will be obvious that when the electromotor 193 is energized thus driving the shaft 192, the same will drive the gears 187 which carry with them the pinions 185 which in turn mesh with the ring gear 194 carried by the cylinder 165 and hence the cylinder 165 will be driven. The rotary rooter also includes, mounted on the exterior of the drum, a plurality of tooth paddles 210 spaced about the circumference of the cylinders 165 and 162. The central tooth 210a is shown in detail in Figure 13 and is shown as comprising plate 211 to which are welded two converging side plates 212 and 213 which in turn are welded to a member 214, shown in detail in Figure 15. The member 214 includes a V-shaped notch 215 to which in practice there is welded a channel shaped cover 216 and an extension 217, which portions are readily replaceable when worn or broken. The fingers to either side of the center finger 210a are constructed from the parts shown in Figure 15 and include, in addition to the parts 214, 216, and 217, a plate 218 adapted to be welded to one side of the member 214 and a notched blade 219, having its notch 220 bordered by edges cut on a bevel so as to fit the member 214, as shown in Figure 14, when in place and welded. It will be appreciated that those fingers to one side of the center finger 210a have the blade 219 reversed in direction to those on the other side so that the action of the blade 219 on rotation of the rotary rooter will be to throw and direct earth centrally thereof.

*Turntable*

Referring now more particularly to Figures 6 and 7, taken in conjunction with Figure 1, it will be noted that frame members 225 and 226 and gusset plate 227 support a plate 228 which carries a pivot ball 229. An upstanding post 230 carries a box socket 231 for pivotally mounting the post 230 on the ball 229. The upper end of the post 230 towards the rear carries a ball socket 232 engaging a ball 233 carried by an arm 234. From each side of the elevator frame 21, extending upwardly and longitudinally, there are provided beams 235, which beams 235 are welded to a box structure 236 which is in turn welded to beams 237 extending generally vertically downward to the elevator frame 21. The box structure 236 supports the arm 234 and thus the post 230 is pivotally mounted between the two vertically aligned balls 229 and 233. The post 230 at its lower end is welded to a plate 238, the outer end of which carries a circular channel 239. The post 230 and the channel 239 are welded to a cross piece 242 which in turn is welded to a pair of spaced beams 240 carrying box sockets 241. An electromotor 243 is mounted upon the frame adjacent the plate 238 and drives an electric winch 244 through a reduction gear box 245. A sheave 246 is mounted upon the opposite side of the frame and a cable 247 is wound with one end anchored in the anchor 248 with its lead running over a segment of the channel 239 to the winch 244, thence to the sheave 246 and from there over a segment of the channel 239 to the adjustable anchor 249.

It will be apparent from the foregoing description that turning of the winch 244 in one direction will cause a rotation of the plate 238 and consequently of the post 230 as well as the arms 242 and all of the structures supported thereby. A track 250 comprising a pair of spaced beams 251 and 252 is provided, which spaced beams are pivotally connected by pivot balls 253 to the sockets 241. The spaced beams 251 and 252 are connected together by a plurality of cross pieces 254.

*Push beam*

Figure 5:
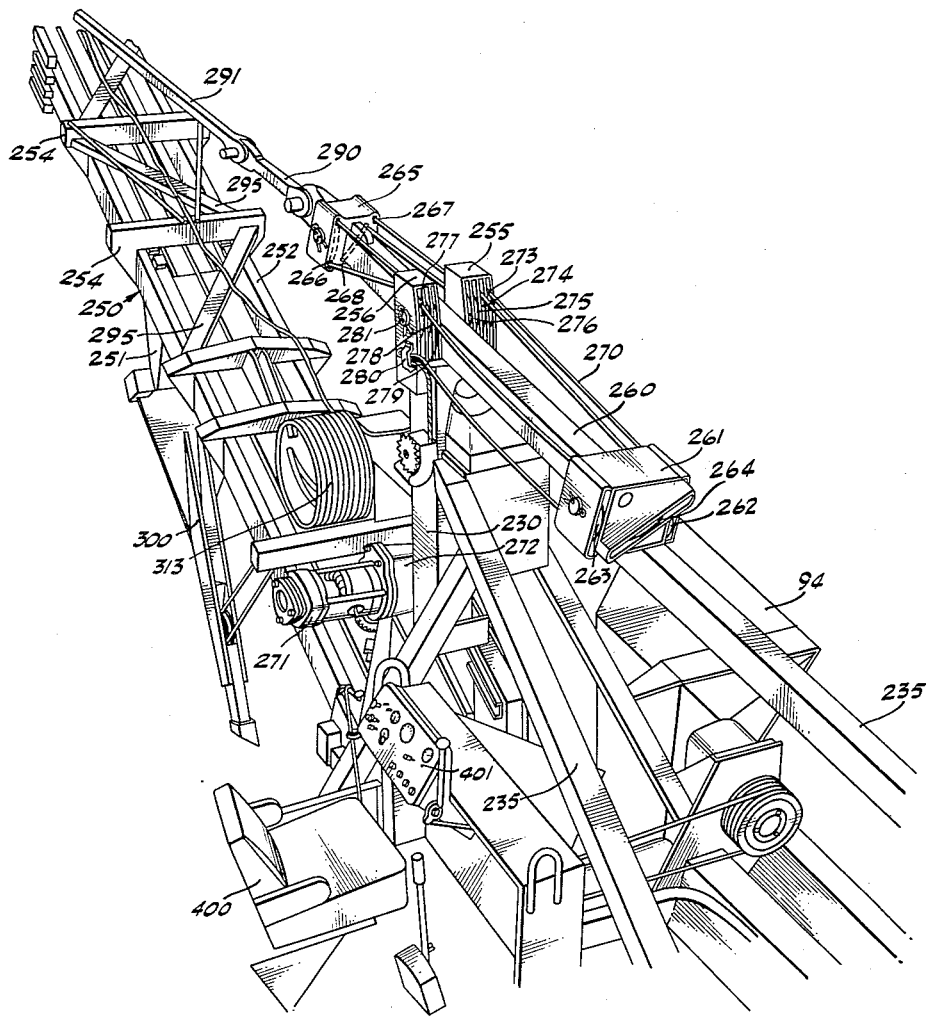
Figure 5 is an enlarged perspective of a portion of the machine viewing it from the operator's cab towards the forward or track end.
Figure 11:
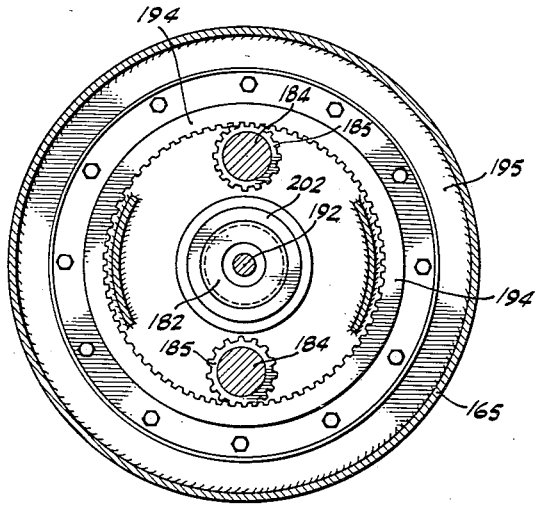
Figure 11 is a section taken along the line 11—11 of Figure 9.

The post 230, at its upper end, is provided with a pair of spaced sheave housings 255 and 256. A push beam 260 is provided in the shape of a box member adapted to slide between the two sheave housings 255 and 256, as most clearly shown in Figure 5. The rear end of the push beam 260 is provided with a box 261, housing a pair of spaced vertically extending sheaves 262 and 263 and a diagonally disposed sheave 264. Toward its forward end, the beam 260 carries a box 265 which houses a pair of spaced vertically extending sheaves 266 and 267 and a diagonally extending sheave 268. A cable 270 is provided, the reeving of which is most clearly shown in Figure 18, taken together with Figure 5. The post 230 supports an electromotor 271 which drives a winch 272 and the cable 270 is wound on the winch 272, one lead of which passes from the winch 272 to the sheave housing 255 which, as shown in Figures 5 and 18, includes four parallel upstanding sheaves 273, 274, 275 and 276. The lead then passes over the sheave 273 to the sheave 262, thence to the sheave 274, from the sheave 274 to the sheave 264, thence to the sheave housing 256 which includes three parallel upstanding sheaves 277, 278 and 279. The lead passes over the sheave 277 to the sheave 263 and thence to an anchor 280. The other lead of the cable 270 passes from the winch 272 over the sheave 275 to the sheave 267, from the sheave 267 to the sheave 276, from the sheave 276 to the sheave 268, thence to the sheave 279 and from the sheave 279 to the sheave 266, from the sheave 266 to the sheave 278 and thence to an adjustable anchor 281.

The push beam 260 at its forward end is pivotally connected to the track 250 as at 292. In Figure 5 is shown a linkage 290 and 291 used to space the push beam from the track when the boom needs to be lowered to a near horizontal position, e. g. when being worked on inside the shop. As the track 250 is pivotally mounted by the pivot balls 253 and the sockets 241, it will be apparent that upon actuation of the electromotor 271 to drive the winch 272, the push beam 260 may be advanced or retracted between the sheave housings 255 and 256 and thus the track may be moved from a raised position, as shown in Figure 1, to an angular position. The track 250, as hereinbefore described, includes two spaced beams 251 and 252 connected together by a plurality of cross pieces 254 and also has diagonally disposed stiffening members 295. The beams 250 and 251 are channel shaped in cross section, and a car 298 is provided, which car 298 comprises a pair of spaced side walls 299 mounting rollers (not shown) which ride in the channels of channel shaped beams 250 and 251. The car 298 pivotally mounts a digging mechanism in the form of a paddle 300 by means of pivot balls 301 formed upon extensions 302 of the walls 299 and sockets 303 carried by arms 304 of paddle 300. The track includes a double sheave housing 305 mounted upon a top plate 306 and housing a pair of sheaves 307 and 308, and also a double sheave housing 309 at the lower end likewise housing a pair of sheaves 310 and 311. The track also includes a mounting plate 312 for mounting a winch 313 which is powered by a reversible electric motor 314. The car 298 is provided with a sheave housing 316, housing three sheaves 317, 318 and 319, and with a sheave housing 320 housing a single sheave 321. The paddle 300 is provided with an upper sheave housing 324 housing a pair of sheaves 325 and 326 and with a lower sheave housing 327 housing a single sheave 328. The car 298 also includes a sheave housing mounting four sheaves 330, 331, 332 and 333, which sheaves are mounted between two walls 299 of the car. The car 298 also mounts a winch 334 driven by a reversible electric motor 335.

Referring to Figures 6 and 18, it will be apparent that a cable 336 is wound upon the winch 313 and has one lead passing under the sheave 310 from which it passes over the sheave 330 down to the sheave 311 over the sheave 331 from where it is dead-ended on the cab as at 337.

The other lead passes from the winch 313 over the sheave 308 under the sheave 332 over the sheave 307 under the sheave 333 and upwards to the cable tightening mechanism 340 on the top of the track where it is dead-ended as at 341.

The winch 334 is provided with a cable 342 wound thereon, one lead of which passes under the sheave 321 around the sheave 328 and back to the car 298 where it is dead-ended as at 343. The other lead of the cable 342 passes from the winch 334 over the sheave 317 to the sheave 325 thence tround the sheave 318, and thence around the sheave 326, thence around the sheave 319 to where it is dead-ended on the car as at 344. It will be noted that the distance from the pivot 301 to the sheaves 325 is one-half the distance from the pivot 301 to the sheave 328, and hence the cable 342 will remain taut although there are but two strands of cable associated with the sheaves 321 and 328, whereas the other end of the paddle is wound with four strands of cable.

The engine 91 is preferably of the internal combustion type and drives a generator (not shown) from which through suitable circuits electric power is provided to the various electromotors hereinabove described. An operator's seat 400 is provided (see Figure 5) adjacent a control panel 401 on which are mounted switches for controlling the various electromotors.

Car rotary rooter

Alternative forms of my invention are shown in Figures 21–27. A digging mechanism in the form of a rotary rooter 403 may be mounted on the traveling car 298 and used for digging instead of the paddle or tooth 300. This rotary rooter 403 is made from a drum similar to the bottom rooter 161 of Figs. 1, 4, 8 and 9. The spaced side walls 299 of car 298 have welded thereto a rooter mounting structure comprising side plates 404, cover plates 405 and 406, and a spacer tube 407 having a pair of arms 408, the plates, arms and tubes all being formed in an integral structures as by welding. A hub 409 is bolted to one of the arms 408 and has splined to its inner periphery a spindle 410 about which the rotary rooter rotates. Welded to the spindle 410 is a motor housing comprising an end plate 411, a cylinder 412 and a bolt ring 413. Bolted to the ring 413 is a hub structure 414 upon which is rotatably mounted the drum of the rooter 403. Thus hub structure 414 is similar to the hub 182 of Figure 9 and the mounting of the rooter and drive gears is substantially the same in both Figures 9 and 25.

A motor 415 is mounted within the cylinder 412 and has its end bell 416 welded to a bolt ring 417 which is in turn bolted to the hub 414 by bolts (not shown). The motor 415 has a drive shaft 418 and a pinion 419 engaging a gear 420 which is rigidly connected to a drive shaft 421. The drive shaft 421 corresponds to the drive shaft 192 of the rooter of Figure 9 and drives a similar gear reduction system to that shown and described in connection with Figures 9 and 10. The other arm 408 is welded to a block assembly 422 which has a shaft 423 non-rotatably mounted in an opening 424 in the block assembly 422. This shaft 423 is similar to the shaft 170 shown in Figure 9 and serves to rotatably support the rooter 403 in a similar way to that shown in Figure 9.

Digging teeth numbered 1 through 9 are mounted on the drum of the rooter 403 as shown in Figures 22–24. Only the three teeth nearest the observer are shown in Figure 22 for purposes of clarity. The positioning of the teeth may be seen in the schematic Figure 24. The details as to the shape and mounting of these teeth have been set forth in Figures 13–15 and the description pertaining thereto.

Digging disks

Figure 26:
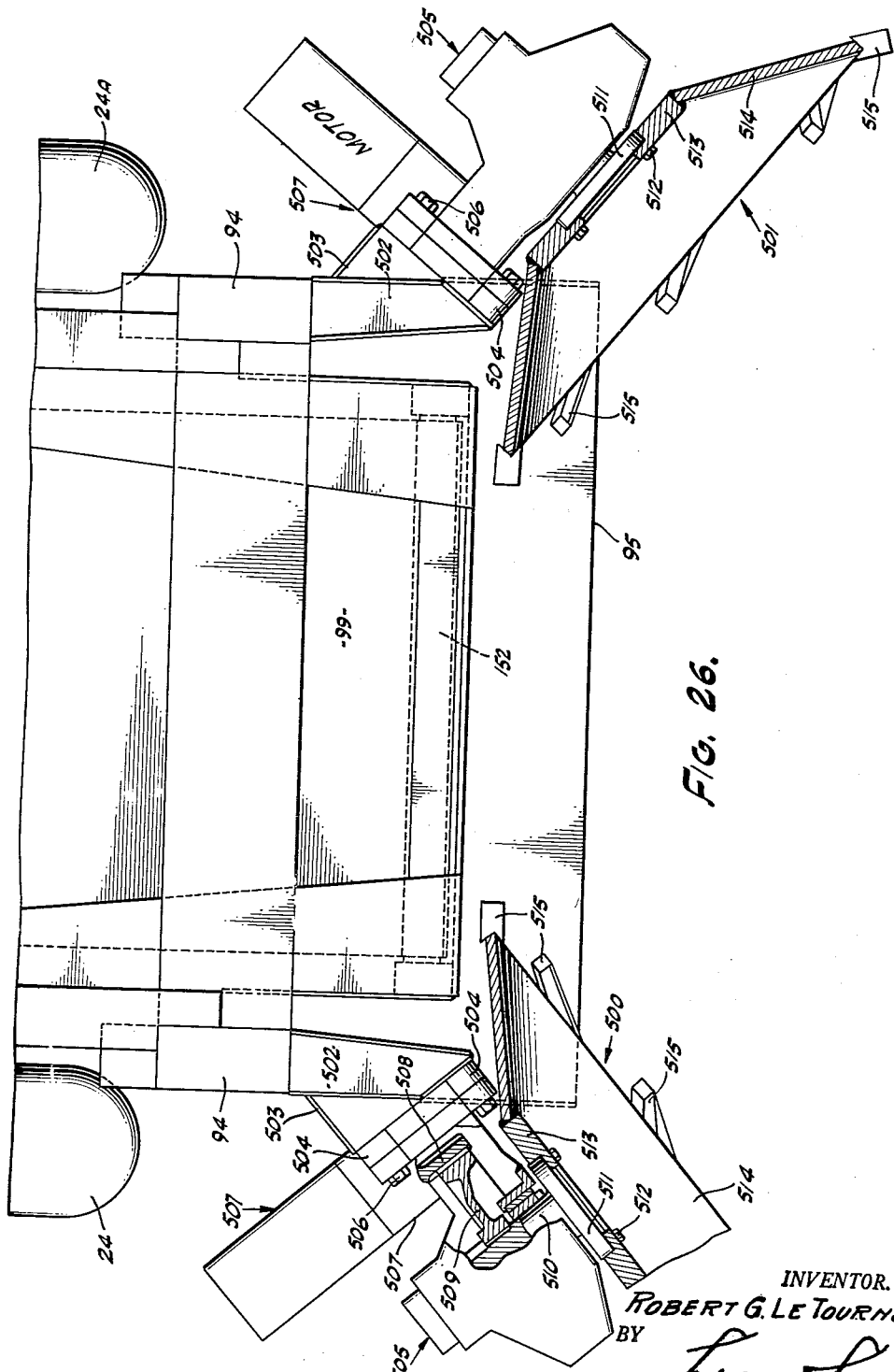
Figure 26 is an enlarged fragmentary top view of the front of the excavating machine showing the mounting of the disks partially in section.
Figures 25, 27:
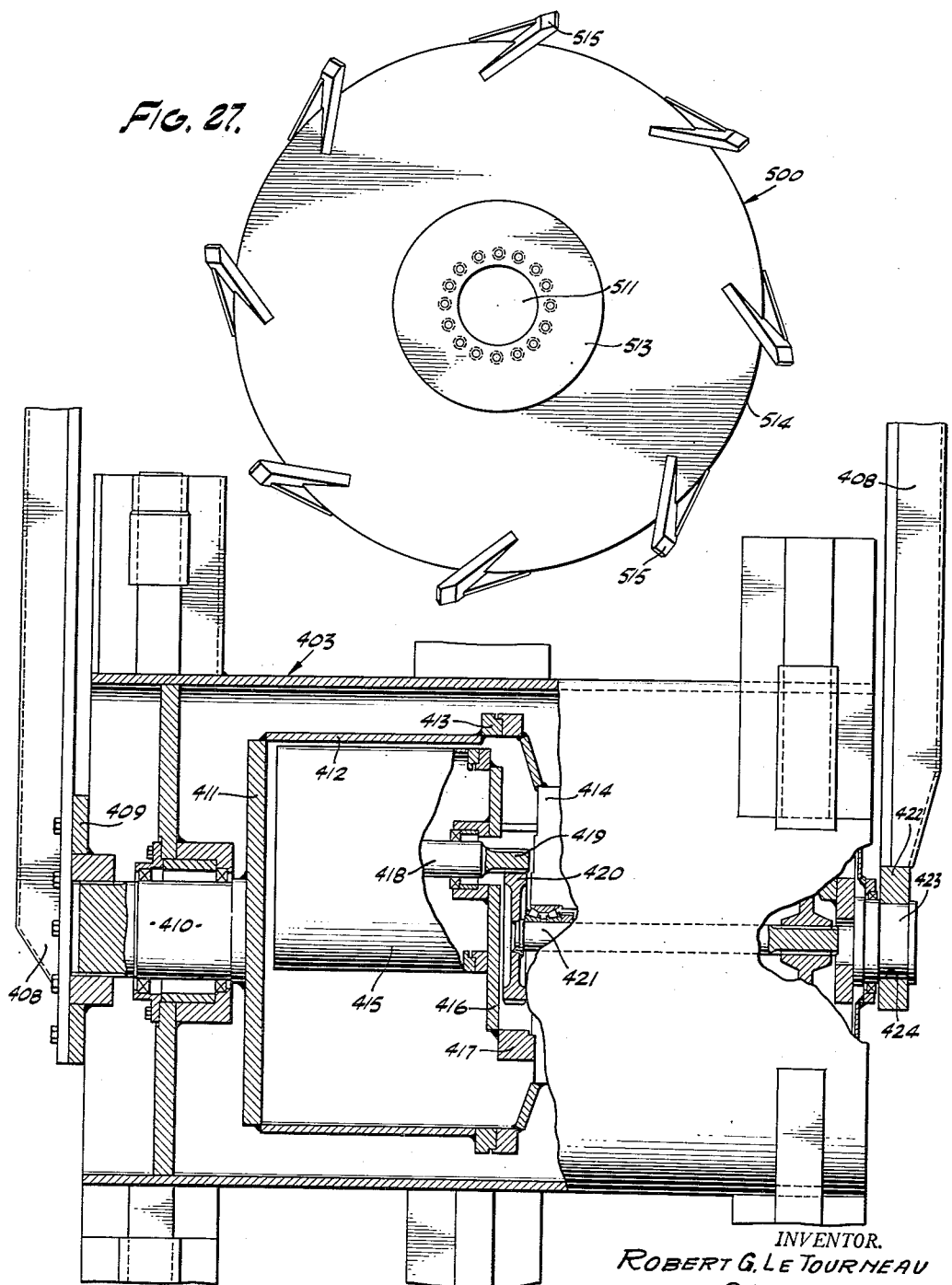
Figure 25 is an enlarged view partially in section of Figure 2.
Figure 27 is a plan view of one of the disks of Figure 26.

Another alternative form of digging means which may be employed in my invention is a pair of digging disks 500 and 501 shown in Figures 21, 26 and 27. The mounting structure for each disk comprises an arm 502 welded to one of the side plates 94 and having a gusset 503 and bolt blocks 504 secured thereto. A gear unit 505 is attached by bolts 506 to the bolt blocks 504. Two motor driven gear boxes 507 are attached to the gear unit 505 by bolts (not shown) and have drive pinions 508 meshing with the gear 509 of the gear unit. The gear 509 is splinded on an axle 510 having a flange 511 to which is bolted the base ring 513 of the disk 500 by bolts 512. Each disk comprises a base ring 513 to which is welded a cone-shaped band 514. On the outer periphery of the band 514 are mounted a group of equally spaced teeth 515.

Operation

From the foregoing description, it will be apparent that the excavating machine of this invention is adapted to approach a hill 402 and dig and load the same, cutting a path directly therethrough graded to either side as desired. The boom or track 250 can be lowered by means of the push beam 260 to the desired position at which time the car 298 may be reciprocated up and down the boom thus causing the digging tooth 300 to dig earth from the hill 402 and urge the same towards the rotary drum or rooter 161 which will throw the earth to the blade 95 and the conveyor belt 99. The conveyor belt will convey the thus excavated earth to the end thereof from which it can be dumped to suitable trucks for disposal. By reason of the turntable 238, the boom can be swung from side to side for grading the cut as the machine advances.

The operation of the embodiment shown in Figure 21 is similar to that described above. The rotary rooter 403 travels with the car 298 down the boom 250 and its teeth rotate to dig earth from the hill 402 and urge the earth towards the rotary digging disks 500 and 501 which will throw the earth to the blade 95 and the conveyor belt 99.

Since the rotary rooter 403 can travel with the car 298 all the way up and down the track 250, the excavating machine of my invention can be quite successfully operated with the rooter as the sole digging and loading means without either the rotary rooter 161 or the digging disks 500 and 501 being mounted on the frame. Thus the rotary rooter 403 will dig earth from the hill 402 as it travels downwardly on the track, and will urge the earth toward the hopper formed by side plates 94 and blade 95. As the car is lowered to the extreme position on the track, the rooter 403 will operate to throw the earth to the blade 95 and the conveyor belt 99.

While there has been described what are at present considered preferred embodiments of the present inven-

What is claimed is:

1. An excavating machine comprising: a tractor; a blade mounted in the front of said tractor; a power driven endless conveyor belt mounted on said tractor with one end adjacent said blade; rotary digging means mounted in advance of the blade to loosen earth and throw it to said blade and conveyor belt; a boom pivotally mounted on said tractor; a car mounted to travel up and down said boom and a digging mechanism on said car; and means for exercising positive control over the movement of said boom in the vertical plane.

2. An excavating machine comprising: a tractor; a blade mounted in the front of said tractor; a power driven endless conveyor belt mounted on said tractor with one end adjacent said blade; rotary digging means mounted in advance of the blade to loosen earth and throw it to said blade and conveyor belt; a boom pivotally mounted on said tractor; a car mounted to travel up and down said boom and a digging mechanism on said car; and a powered push beam mounted to control the movement of said boom about its horizontal pivot axis.

3. An excavating machine comprising: a tractor; a blade mounted in the front of said tractor; a power driven endless conveyor belt mounted on said tractor with one end adjacent said blade; rotary digging means mounted in advance of the blade to loosen earth and throw it to said blade and conveyor belt; a boom pivotally mounted on said tractor; a car mounted to travel up and down said boom and a digging mechanism on said car; said boom being mounted to be raised or lowered and also to swing about a vertical axis; and said digging mechanism being adapted on travel of said car down said boom to cut a path parallel to the line of said boom; and means for exerting positive pressure on said boom to hold said digging mechanism in positive contact with the work surface.

4. An excavating machine comprising: a tractor; a blade mounted in the front of said tractor; a power driven endless conveyor belt mounted on said tractor with one end adjacent said blade; rotary digging means mounted in advance of the blade to loosen earth and throw it to said blade and conveyor belt; a boom pivotally mounted on said tractor; a car mounted to travel up and down said boom and a digging mechanism on said car; said boom being mounted to be raised or lowered and also to swing about a vertical axis; a push beam for controlling movement of said boom about the horizontal axis; said digging mechanism being adapted on travel of said car down said boom to cut a path parallel to the line of said boom; and whereby said digging mechanism may grade a cut to either side of said tractor and at any desired angle of repose.

References Cited in the file of this patent

UNITED STATES PATENTS

| | | |
|---|---|---|
| 542,375 | Scoles | July 9, 1895 |
| 758,624 | Dobson | May 3, 1904 |
| 818,214 | Anderson | Apr. 17, 1906 |
| 919,105 | Wischow | Apr. 20, 1909 |
| 946,899 | Hayward | Jan. 18, 1910 |
| 1,082,011 | Damman | Dec. 23, 1913 |
| 1,182,875 | Jackson | May 9, 1916 |
| 1,243,293 | Hoenecke | Oct. 16, 1917 |
| 1,426,691 | Videtto | Aug. 22, 1922 |
| 1,535,699 | Talbot | Apr. 28, 1925 |
| 1,662,832 | Nelson et al. | Mar. 20, 1928 |
| 1,748,931 | Lehman et al. | Feb. 25, 1930 |
| 1,850,814 | Snyder | Mar. 22, 1932 |
| 1,858,327 | Hays | May 17, 1932 |
| 1,887,117 | Colley | Nov. 8, 1932 |
| 1,977,815 | Abbe | Oct. 23, 1934 |
| 1,988,254 | Smith | Jan. 15, 1935 |
| 2,195,471 | Sishc | Apr. 2, 1940 |
| 2,208,128 | Holbrook et al. | July 16, 1940 |
| 2,251,583 | White | Aug. 5, 1941 |
| 2,444,835 | Le Tourneau | July 6, 1948 |
| 2,467,619 | Griffith et al. | Apr. 19, 1949 |
| 2,498,044 | Le Tourneau | Feb. 21, 1950 |
| 2,579,025 | Van Donselaar | Dec. 18, 1951 |
| 2,618,083 | Armington et al. | Nov. 18, 1952 |
| 2,631,718 | Rinehart | Mar. 17, 1953 |

FOREIGN PATENTS

| | | |
|---|---|---|
| 221,164 | Germany | Apr. 21, 1910 |
| 732,111 | Germany | Feb. 22, 1943 |
| 370,645 | Great Britain | Apr. 14, 1932 |
| 453,649 | Italy | Dec. 9, 1949 |